United States Patent [19]
Hartwig et al.

[11] Patent Number: 5,162,385
[45] Date of Patent: Nov. 10, 1992

[54] PREPARATION OF HARD FOAMS CONTAINING URETHANE GROUPS OR CONTAINING URETHANE AND ISOCYANURATE GROUPS

[75] Inventors: Uwe Hartwig; Hansjuergen Kessler, both of Mannheim; Eckhard Ropte, Ludwigshafen, all of Fed. Rep. of Germany

[73] Assignee: BASF Aktiengesellschaft, Fed. Rep. of Germany

[21] Appl. No.: 746,833

[22] Filed: Aug. 19, 1991

[30] Foreign Application Priority Data

Sep. 6, 1990 [DE] Fed. Rep. of Germany ....... 4028211

[51] Int. Cl.$^5$ .............................................. C08J 9/08
[52] U.S. Cl. .................... 521/118; 521/125; 521/129; 521/130; 521/902
[58] Field of Search ............... 521/118, 125, 129, 130, 521/902

[56] References Cited

U.S. PATENT DOCUMENTS

| | | | |
|---|---|---|---|
| 4,743,627 | 5/1988 | Narayan et al. | 521/160 |
| 4,758,605 | 7/1988 | Williams | 521/129 |
| 5,025,039 | 6/1991 | Neuhaus et al. | 521/128 |

Primary Examiner—Morton Foelak
Attorney, Agent, or Firm—Martin P. Connaughton

[57] ABSTRACT

A process for the preparation of a hard foam containing urethane groups or containing urethane and isocyanurate groups involves reacting a) an organic and/or modified organic polyisocyanate with b) at least one high-molecular-weight compound containing at least two reactive hydrogen atoms and, if desired, c) a low-molecular-weight chain extender and/or crosslinking agent, in the presence of d) a blowing agent, e) a catalyst and, if desired, f) assistants and/or additives, where the blowing agent (d) used is at least one organic carboxylic acid, preferably an aliphatic monocarboxylic acid, alone or in combination with water and/or a physical blowing agent, and the catalyst (e) used is a polyisocyanurate catalyst, preferably an alkali metal salt or ammonium salt of an organic carboxylic acid or tris(dialkylaminoalkyl)-s-hexahydrotriazine.

8 Claims, No Drawings

PREPARATION OF HARD FOAMS CONTAINING URETHANE GROUPS OR CONTAINING URETHANE AND ISOCYANURATE GROUPS

The present invention relates to a process for the preparation of hard foams containing urethane groups or containing urethane and isocyanurate groups in which, as blowing agent, at least one organic carboxylic acid is employed, alone or combination with water and/or a physical blowing agent, and, as catalyst, a polyisocyanurate catalyst is employed, preferably an alkali metal salt or ammonium salt of an organic carboxylic acid or tris(dialkylaminoalkyl)-s-hexahydrotriazine.

The preparation of foams containing urethane groups (abbreviated to PU foams below) having a wide range of mechanical properties by reacting a high-molecular-weight polyhydroxyl compound and, if desired, a low-molecular-weight chain extender or crosslinking agent with an organic polyisocyanate in the presence of a catalyst, blowing agent and, if desired, assistants and/or additives is known and is described in numerous patents and elsewhere in the literature. A suitable choice of synthesis components in this process allows the preparation of soft elastic, semihard or hard PU foams.

Neither is the preparation of foams containing bonded urethane and isocyanurate groups novel. In this process, organic polyisocyanates are partially cyclized and polymerized in the presence of catalysts, and the resultant polyisocyanates containing isocyanurate groups (PIR) are then reacted with polyhydroxyl compounds in the presence of PU catalysts and blowing agents. In another procedure, the organic polyisocyanates are at the same time partially cyclized in the presence of excess amounts of polyhydroxyl compounds, catalysts with various actions and blowing agents, and the polyhydroxyl compounds are added onto the isocyanurate-containing and unmodified polyisocyanates formed.

A review of the preparation of hard PU foams and PU-PIR foams has been published, for example, in the monograph by J. H. Saunders and K. C. Frisch, High Polymers, volume XVI, Polyurethanes, parts and 2, Interscience Publishers, 1962 and 1964 respectively, and the Kunststoff-Handbuch, Volume VII, Polyurethane, Carl-Hanser Verlag, Munich, 1st Edition, 1966, and 2nd Edition, 1983.

It is furthermore known to use hard PU or PU-PIR foams of this type to produce composite or sandwich elements, which are usually built up from a hard foam and at least one, preferably two, outer layers of a rigid or elastic material, for example paper, plastic film, metal sheeting, glass nonwoven material, chipboard, inter alia. Also known is the foam-filling of cavities in domestic appliances, such as refrigeration equipment, for example refrigerators or freezers, or of hot-water storage tanks, with hard foams of this type as thermal insulators.

The blowing agents employed for the preparation of high- and low-temperature insulating hard PU or PU-PIR foams throughout the world on a large scale are fluorochloroalkanes, preferably trichlorofluoromethane. The only disadvantage of these blowing gases is environmental pollution, since they are suspected of participating in degradation of the ozone layer in the stratosphere.

To reduce the amount of fluorochloroalkanes, the blowing gas predominantly employed is water, which reacts with the polyisocyanate to form carbon dioxide, which acts as the actual blowing agent. A disadvantage in hard foam formulations of this type is the high polyisocyanate consumption merely for the reaction of water to form the carbon dioxide. A further disadvantage is in many cases an impairment of the property profile of the resultant PU foams. In order, for example, to pass the same fire test, the content of flameproofing agents must be increased. In addition, foams blown using carbon dioxide from water have increased shrinkage and increased brittleness, and the reaction mixtures for their preparation have poor flow properties.

It is furthermore known to form carbon dioxide by reacting an organic carboxylic acid with an isocyanate in accordance with the reaction equations below:

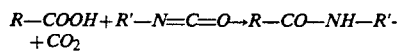

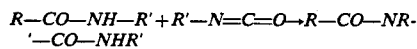

Accordingly, 1 mole of carboxylic acid and moles of isocyanate give acylurea and 1 mole of carbon dioxide.

In accordance with these reactions, carboxylic acids are also employed as blowing agents for the preparation of PU foams.

The blowing agent used in DE-A 32 23 567 (GB 2,103,228) for the preparation of a foam is at least one carboxylic acid or carboxylic acid salt, which liberates a gas on reaction with an isocyanate. Use of the formic acid which is mentioned as being preferred forms one mole of toxic carbon monoxide as well as one mole of carbon dioxide, thus requiring the foaming equipment to have more safety devices.

The catalysts described in U.S. Pat. No. 4,473,666 as being suitable for the preparation of PU foams blown using carboxylic acids are catalyst systems which contain a dialkylcyclohexylamine and an N-substituted alkoxyalkylpiperazine.

According to EP-A-0 322 801, the formation of hard PU foams using formic acid as blowing agent is carried out using amine catalyst combinations which contain from 30 to 50 parts by weight of triethylenediamine, from 30 to 50 parts by weight of bis(dimethylaminoethyl) ether and/or N,N,N',N'',N''-pentamethyldiethylenetriamine and from 0 to 40 parts by weight of tetramethylhexamethylenediamine and trimethylaminoethylpiperazine.

According to EP-A-0 372 292, the blowing agent used for the production of PU moldings having a bulk density of at least 250 kg/m$^3$ and a compact surface by foam molding a reaction mixture containing polyisocyanates and at least one compound having at least two reactive hydrogen atoms, having an isocyanate characteristic number in the range from 75 to 1,500, is an organic carboxylic acid, alone or in combination with further chemical or physical blowing agents.

EP-A-373 456 prepares open-cell, hydrophilic PU foams having a density of from 10 to 16 kg/m$^3$ using water as the blowing agent. In addition, however, from 5 to 20 mmol of an acid, for example phosphoric acid, are also used, based on 100 g of the mixture of polyhydroxyl compound, water and, if desired, additives.

It is disadvantageous in this known process that the volume of carbon dioxide, which is formed from the carboxylic acid and the isocyanate and, on simultaneous polyaddition of the synthesis components, causes expansion of the reaction mixture, is usually less than the theoretically possible value. It was furthermore apparent that, in the presence of conventional polyurethane catalysts, for example tertiary amines and/or metal salts of organic carboxylic acids, the carboxylic acid/isocyanate reaction is frequently inhibited and the yield of carbon dioxide is thereby additionally reduced. This means that more carboxylic acid than the stoichiometry would require must be employed in order to achieve a certain foam density. However, the excess carboxylic acid is included in the foam and can cause undesired changes in the mechanical properties of the latter, particularly as aging advances.

It is an object of the present invention to reduce the amount of fluorochlorohydrocarbons which are widespread as blowing agents in the preparation of hard PU and PU-PIR foams or to replace them as fully as possible by other blowing gases. The mechanical properties of the hard foams prepared should at least correspond to foams containing fluorochlorohydrocarbons or have better values.

We have found that, surprisingly, this object is achieved by using an organic carboxylic acid as the blowing agent in combination with a polyisocyanurate catalyst.

The present invention accordingly provides a process for the preparation of a hard foam containing urethane groups or containing urethane and isocyanurate groups, by reacting
a) an organic and/or modified organic polyisocyanate with
b) at least one high-molecular-weight compound containing at least two reactive hydrogen atoms and, if desired,
c) a low-molecular-weight chain extender and/or cross-linking agent,
in the presence of
d) a blowing agent,
e) a catalyst and, if desired,
f) assistants and/or additives,
wherein the blowing agent (d) used is at least one organic carboxylic acid, preferably an aliphatic monocarboxylic acid having a molecular weight of from 60 to 300, in particular acetic acid, and the catalyst (e) used is a polyisocyanurate catalyst, preferably an alkali metal salt or ammonium salt of an organic carboxylic acid or tris(dialkylaminoalkyl)-s-hexahydrotriazine.

When a polyisocyanurate catalyst and an organic carboxylic acid are used according to the invention to prepare a hard PU or PU-PIR foam, it is apparent, surprisingly, that more carbon dioxide is formed as blowing gas than would be expected on the basis of the stoichiocarboxylic acid/isocyanate reaction. If the organic monocarboxylic acid used is acetic acid, the carbon dioxide yield corresponds at least to the theoretical value or is up to about 25% by volume greater than would be expected on the basis of the stoichiometric calculation. Thus, when acetic acid is used as the only blowing agent in the process according to the invention, ie. from essentially anhydrous formulations and in the absence of physical blowing agents, for the formation of carbon dioxide as the blowing gas, hard PU or PU-PIR foams having a density of 0.028 g/cm$^3$ or more are prepared.

It is furthermore advantageous that the addition of the organic carboxylic acid improves the flow behavior of the reaction mixture for formation of the foam. For the same flow length, for example, a formulation blown using acetic acid has significantly superior gas output than a formulation blown using trichlorofluoromethane. The addition of the organic carboxylic acid reduces the tendency toward shrinkage of the hard foam prepared and, in contrast to water, does not impair the flame resistance in the presence of flameproofing agents.

The preparation of the hard PU or PU-PIR foams by the process according to the invention is carried out using conventional (with the exception of the organic carboxylic acid and the polyisocyanurate catalyst) synthesis components, with respect to which the following details apply.

a) Suitable organic polyisocyanates are conventional aliphatic, cycloaliphatic, araliphatic and, preferably, aromatic polyisocyanates.

The following may be mentioned as examples: alkylene diisocyanates having from 4 to 12 carbons in the alkylene, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate, and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and, preferably, aromatic diisocyanates and polyisocyanates, eg. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenylpolymethylene polyisocyanates, mixtures of 4,4'-, 2,4'- and 2,2'-diphenylmethane diisocyanates, and polyphenylpolymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, ie. products obtained by partial chemical reaction of organic diisocyanates and/or polyisocyanates. Specific examples are ester-, urea-, biuret-, allophanate-, carbodiimide-, isocyanurate- and/or urethane-containing diisocyanates and/or polyisocyanates. Individual examples are urethane-containing organic, preferably aromatic polyisocyanates containing from 33.6 to 15% by weight, preferably from 31 to 21% by weight, of NCO, based on the total weight, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 1500, specific examples of di- and polyoxyalkylene glycols, which can be employed individually or as mixtures, being diethylene glycol, dipropylene glycol, polyoxyethylene-, polyoxypropylene- and polyoxypropylene-polyoxyethylene glycols or -triols. NCO-containing prepolymers containing from 25 to 9% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4'and/or 2,6-tolylene diisocyanates or crude MDI are also suitable. Furthermore, liquid, carbodiimide- and/or isocyanurate ring-containing polyisocyanates containing from 33.6 to 15% by weight, preferably from 31 to 21% by weight, of NCO, based on the total weight, for example based on 4,4'-, 2,4'- and/or 2,2'-diphenylmethane diisocyanate and/or 2,4'- and/or 2,6-tolylene diisocyanate, have also proven successful.

The modified polyisocyanates can, if desired, be mixed with one another or with unmodified organic polyisocyanates, eg. 2,4'- and 4,4'-diphenylmethane diisocyanate, crude MDI, 2,4- and/or 2,6-tolylene diisocyanate.

Particularly suitable organic polyisocyanates, and thus those which are preferably used for the preparation of the hard PU foams, are mixtures of tolylene diisocyanates and crude MDI or mixtures of modified urethane-containing organic polyisocyanates containing from 33.6 to 15% by weight of NCO, in particular those based on tolylene diisocyanates, 4,4'-diphenylmethane diisocyanate, diphenylmethane diisocyanate isomer mixtures or crude MDI and, in particular, crude MDI containing from 30 to 80% by weight, preferably from 30 to 55% by weight, of diphenylmethane diisocyanate isomers.

b) Suitable high-molecular-weight compounds having two or more reactive hydrogen atoms (b) are preferably polyhydroxyl compounds having a functionality of from 2 to 8, preferably from 3 to 8, and a hydroxyl number of from 150 to 850, preferably from 200 to 600.

Specific examples are polythioether polyols, polyester amides, hydroxyl-containing polyacetals, hydroxyl-containing aliphatic polycarbonates and preferably polyester-polyols and polyether-polyols. Mixtures of two or more of said polyhydroxyl compounds can also be used if they have a mean hydroxyl number in said range.

Suitable polyester-polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used both individually and as mixtures with one another. The free dicarboxylic acids may also be replaced by the corresponding dicarboxylic acid derivatives, eg. monoesters or diesters of dicarboxylic acids with alcohols having from 1 to 4 carbon atoms, or dicarboxylic anhydrides. Preference is given to dicarboxylic acid mixtures comprising succinic acid, glutaric acid and adipic acid in mixing ratios of, for example, from 20 to 35:35 to 50:20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol or mixtures of two or more of said diols, in particular mixtures of 1,4-butanediol, 1,5-pentanediol and 1,6-hexanediol. Furthermore, polyester-polyols made from lactones, eg. $\epsilon$-caprolactone, or hydroxycarboxylic acids, eg. $\omega$-hydroxycaproic acid, can also be employed.

The polyester-polyols can be prepared by polycondensing the organic, eg. aromatic or preferably aliphatic, polycarboxylic acids and/or derivatives thereof with polyhydric alcohols without using a catalyst or preferably in the presence of esterification catalysts, expediently in an inert gas atmosphere, eg. of nitrogen, carbon dioxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, is reached. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers, eg. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 3 and a hydroxyl number of from 150 to 400, in particular from 200 to 300.

However, the preferred polyhydroxyl compounds are polyether-polyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide, as catalysts and using one or more initiator molecules containing from 2 to 8, preferably from 3 to 8, reactive hydrogen atoms in bound form, or by cationic polymerization using Lewis acids, such as antimony pentachloride, boron fluoride etherate, inter alia, or bleaching earth as catalysts, from one or more alkylene oxides having from 2 to 4 carbons in the alkylene.

Examples of suitable alkylene oxides are tetrahydrofuran, 1,3-propylene oxide, 1,2- and 2,3-butylene oxide, styrene oxide and, preferably, ethylene oxide and 1,2-propylene oxide. The alkylene oxides can be used individually, successively in an alternating manner or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- or N,N'-dialkyl-substituted diamines having from 1 to 4 carbon atoms in the alkyl, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine, and 4,4'-, 2,4'- and 2,2'-diaminodiphenylmethane.

Other suitable initiator molecules are alkanolamines, such as ethanolamine, diethanolamine, N-methyl- and N-ethylethanolamine, N-methyl- and N-ethyldiethanolamine and triethanolamine, and ammonia. Preference is given to polyhydric alcohols, in particular those containing two or in particular three or more hydroxyl groups, such as ethanediol, 1,2- and 1,3-propanediol, diethylene glycol, dipropylene glycol, 1,4-butanediol, 1,6-hexanediol, glycerol, trimethylolpropane, penraerythritol, sorbitol and sucrose.

The polyether-polyols preferably have a functionality of from 3 to 8, in particular from 3 to 6, and a hydroxyl number of preferably from 200 to 850, in particular from 300 to 600.

Other suitable polyether-polyols are melamine-polyether-polyol dispersions as described in EP-A-23 987 (U.S. Pat. No. 4,293,657), polymer-polyetherpolyol dispersions prepared from polyepoxides and epoxy resin curing agents in the presence of polyether-polyols, as described in DE 29 43 689 (U.S. Pat. No. 4,305,861), dispersions of aromatic polyesters in polyhydroxyl compounds, as described in EP-A-62 204 (U.S. Pat. No. 4,435,537) and DE-A 3,300,474, dispersions of organic and/or inorganic fillers in polyhydroxyl compounds, as described in EP-A-11751 (U.S. Pat. No. 4,243,755), polyurea-polyether-polyol dispersions, as described in DE-A-31 25 402, tris(hydroxyalkyl)isocyanurate-polyether-polyol dispersions, as described in EP-A-136 571 (U.S. Pat. No. 4,514,526), and crystallite suspensions, as described in DE-A-33 42 176 and DE-A-33 42 177 (U.S. Pat. No. 4,560,708); the statements in said patent publications are to be regarded as part of the patent description.

Like the polyester-polyols, the polyether-polyols can be used individually or in the form of mixtures. Furthermore, they can be mixed with the above-mentioned dispersions, suspensions or polyester-polyols and the hydroxyl-containing polyester amides, polyacetals and/or polycarbonates.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, eg. diphenyl carbonate, or phosgene.

The polyester amides include, for example, the predominantly linear condensates obtained from polybasic, saturated and/or unsaturated carboxylic acids or anhydrides thereof and aminoalcohols or mixtures of polyhydric alcohols and aminoalcohols and/or polyamines.

Particularly useful polyhydroxyl compounds, and therefore those which are preferably used, are mixtures which expediently contain, based on 100 parts by weight:

bi) from 0 to 95 parts by weight, preferably from 20 to 80 parts by weight, of a sucrose-initiated polyether-polyol having a hydroxyl number of from 300 to 500, preferably from 350 to 450, based on 1,2-propylene oxide or a mixture of 1,2-propylene oxide and ethylene oxide, bii) from 0 to 15 parts by weight, preferably from 5 to 15 parts by weight, of a sorbitol-initiated polyether-polyol having a hydroxyl number of from 400 to 600, preferably from 450 to 550, based on 1,2-propylene oxide or a mixture of 1,2-propylene oxide and ethylene oxide, biii) from 0 to 20 parts by weight, preferably from 5 to 15 parts by weight, of an ethylenediamine-initiated polyether-polyol having a hydroxyl number of from 700 to 850, preferably from 750 to 800, based on 1,2-propylene oxide, and biiii) from 0 to 60 parts by weight, preferably from 5 to 40 parts by weight, of a polyether-polyol having a hydroxyl number of from 400 to 600, preferably from 450 to 550, based on 1,2-propylene oxide or a mixture of 1,2-propylene oxide and ethylene oxide, prepared using a mixture of sucrose and triethanolamine in a weight ratio of from 1:2 to 2:1 as initiator molecules.

c) The hard PU or PU-PIR foams can be prepared in the presence or absence of chain extenders and/or crosslinking agents, but their addition, or mixtures of them, may prove advantageous in order to modify the mechanical properties. The chain extenders and/or crosslinking agents are preferably alkanolamines and in particular diols and/or triols having molecular weights of less than 400, preferably from 60 to 300. Examples are alkanolamines, eg. trialkanolamines, eg. triethanolamine and triisopropanolamine, and products of the addition of ethylene oxide or 1,2-propylene oxide with alkylenediamines having from 2 to 6 carbons in the alkylene, eg. N,N,N',N'-tetra(2-hydroxyethyl)ethylenediamine and N,N,N',N'-tetra(2-hydroxypropyl)ethylenediamine, aliphatic, cycloaliphatic and/or araliphatic diols having from 2 to 14, preferably from 4 to 10-carbon atoms, eg. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis-(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide, and aromatic diamines, eg. tolylenediamines and/or diaminodiphenylmethanes, and the abovementioned alkanolamines, diols and/or triols as initiator molecules.

If chain extenders, crosslinking agents, or mixtures thereof are used to prepare the hard PU or PU-PIR foams, they are expediently employed in an amount of from 0 to 20% by weight, preferably from 2 to 8% by weight, based on the weight of the polyhydroxyl compound.

d) The blowing agent used to prepare the hard PU or PU-PIR foams is, according to the invention, an organic carboxylic acid which forms carbon dioxide as blowing gas on reaction with the polyisocyanate. The organic carboxylic acid is preferably used as the only blowing agent. However, since acylureas additionally form, along with the carbon dioxide, it may be expedient, in order to produce hard foams having specific mechanical properties, to use the organic carboxylic acid in combination with water or a physical, inert blowing agent or a mixture of water a physical, inert blowing agent. In this case, the amount of water present in the polyether- or polyester-polyol from its preparation is frequently sufficient, and no further addition is required.

The organic carboxylic acid used is advantageously an aliphatic mono- or polycarboxylic acid, for example dicarboxylic acid. However, other organic mono- and polycarboxylic acids are suitable. The organic carboxylic acid may also, if desired, contain bonded substituents which are inert under the reaction conditions for the preparation of foam or are reactive with isocyanates and/or may contain olefinically unsaturated groups. Examples of chemically inert substituents are halogen atoms, for example fluorine and/or chlorine atoms, and alkyl radicals, for example methyl and ethyl radicals. The substituted organic carboxylic acid expediently contains at least one further group which is reactive towards isocyanates, for example a mercapto group, a primary and/or secondary amino group or, preferably a primary and/or secondary hydroxyl group.

Suitable carboxylic acids are thus substituted or unsubstituted monocarboxylic acids, for example acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, ricinoleic acid, 2-aminopropionic acid, benzoic acid, 4-methylbenzoic acid, salicylic acid and anthranilic acid, and substituted or unsubstituted polycarboxylic acids, preferably dicarboxylic acids, for example oxalic acid, malonic acid, succinic acid, fumaric acid, maleic acid, glutaric acid, adipic acid, sebacic acid, dodecanedioic acid, tartaric acid, phthalic acid, isophthalic acid and citric acid. The mono- and/or polycarboxylic acids may be used individually or in the form of a mixture. A crystalline carboxylic acid or a carboxylic acid having low solubility in the synthesis components for the preparation of the hard foams is expediently used in combination with water and/or a chain extender, such as dipropylene glycol.

The preferred blowing agent (d) employed is an aliphatic monocarboxylic acid having a molecular weight of from 46 to 300, in particular from 60 to 135, for example acetic acid, propionic acid or 2-ethylhexanoic acid, in particular acetic acid.

As stated above, a physical blowing agent may be employed in addition to the organic carboxylic acid or the mixture of an organic carboxylic acid and water. Examples of suitable blowing agents of said type are selected from the group comprising the alkanes, cycloalkanes having up to 6 carbon atoms, preferably 5 or 6 carbon atoms, dialkyl ethers, cycloalkylene ethers and fluoroalkanes. It is also possible to use mixtures of at least two compounds from said groups of compounds. Specific examples are alkanes, for example propane, n-butane or isobutane, cycloalkanes, for example cyclobutane or preferably cyclopentane and cyclohexane, dialkyl ethers, for example dimethyl ether, methyl ethyl ether or diethyl ether, cycloalkylene ethers, for example furan, and fluoroalkanes which are degraded in the troposphere and are therefore benign to the ozone layer, for example trifluoromethane, difluoromethane, difluoroethane, tetrafluoroethane or heptafluoropropane.

The total amount of blowing agent employed depends on the desired density of the hard foam. In general, the carboxylic acid or mixture is used in an amount of from 0.5 to 30 parts by weight, preferably from 1 to 15 parts by weight, in particular from 1 to 8 parts by weight, based on 100 parts by weight of the high-molecular-weight compound containing at least two reactive hydrogen atoms (b). If used at all, the water and/or the physical blowing agent are used in minor amounts, for example less than 50% by weight, based on the total weight of the blowing agent mixture. For example, from 0 to 5 parts by weight, preferably from 0 to 3 parts by weight, in particular from 0 to 2 parts by weight, of water and/or from 0 to 30 parts by weight, preferably from 0 to 20 parts by weight, in particular from 0 to 15 parts by weight, of one or more physical blowing agents can be employed, based on 100 parts by weight of the high-molecular-weight compound containing at least two reactive hydrogen atoms (b).

e) To prepare the hard PU and PU-PIR foams by the process according to the invention, it is essential to carry out the reaction in the presence of a polyisocyanurate catalyst. Suitable polyisocyanurate catalysts are alkali salts, for example sodium salts, preferably potassium salts and ammonium salts, of organic carboxylic acids, expediently having from 1 to 8 carbon atoms, preferably 1 or 2 carbon atoms, for example the salts of formic acid, acetic acid, propionic acid or octanoic acid, and tris(dialkylaminoalkyl)-s-hexahydrotriazines, for example tris(dimethylaminoethyl]-, tris(dimethylaminopropyl)-, tris(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(dimethylaminopropyl)-s-hexahydrotriazine are polyisocyanurate catalysts which are particularly used. The suitable polyisocyanurate catalyst is usually used in an amount of from 1 to 10 parts by weight, preferably from 1.5 to 8 parts by weight, based on 100 parts by weight of the high-molecular-weight compound containing at least two reactive hydrogen atoms (b).

The preparation of the hard PU and PU-PIR foams is particularly successful if the blowing agent (d) used is at least one aliphatic monocarboxylic acid, selected from the group comprising acetic acid, propionic acid and 2-ethylhexanoic acid, in combination with, as catalyst (e), at least one polyisocyanurate catalyst selected from the group comprising (trimethyl-2-hydroxypropyl)ammonium octanoate, (trimethyl-2-hydroxypropyl)ammonium formate, potassium acetate, potassium formate and tris(dialkyl-aminoalkyl)-s-hexahydrotriazine.

In addition to the polyisocyanurate catalyst which is necessary according to the invention, it is also possible to use, as catalyst, other compounds which greatly accelerate the reaction of the compounds of component (b) containing hydroxyl groups and, if used, (c) with the modified or unmodified polyisocyanate. Examples of suitable compounds are organometallic compounds, preferably organotin compounds, such as tin(II) salts of organic carboxylic acids, for example tin(II) acetate, tin(II) octanoate, tin(II) ethylhexanoate and tin(II) laurate, and the dialkyltin(IV) salts of organic carboxylic acids, for example dibutyltin diacetate, dibutyltin dilaurate, dibutyltin maleate and dioctyltin diacetate, and tertiary amines, for example triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, pentamethyldiethylenetriamine, tetramethyldiaminoethyl ether, bis(dimethylaminopropyl)urea, dimethylpiperazine, 1,2-dimethylimidazole,1-azabicyclo[3.3.0]octaneand preferably 1,4-diazabicyclo[2.2.2]octane, and alkanolamine compounds, such as triethanolamine, triisopropanolamine, N-methyl- and N-ethyldiethanolamine and dimethylethanolamine.

f) It is also possible to add, if desired, assistants and/or additives (f) to the reaction mixture for the preparation of the hard PU or PU-PIR foams. Specific examples are surfactants, foam stabilizers, cell regulators, fillers, dyes, pigments, flameproofing agents, hydrolysis-protection agents, and fungistatic and bacteriostatic substances.

Examples of suitable surfactants are compounds which serve to support homogenization of the starting materials and may also be suitable for regulating the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acid, eg. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

For the purposes of the invention, fillers, in particular reinforcing fillers, are conventional organic and inorganic fillers, reinforcing agents, weighting agents, agents for improving the abrasion behavior in paints, coating agents etc. Specific examples are inorganic fillers, such as silicate minerals, for example phyllosilicates, such as antigorite, serpentine, hornblends, amphiboles, chrysotile and talc; metal oxides, such as kaolin, aluminum oxides, aluminum silicate, titanium oxides and iron oxides, metal salts, such as chalk, baryte and inorganic pigments, such as cadmium sulfide and zinc sulfide, and glass particles. Examples of suitable organic fillers are carbon black, melamine, collophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c)

Examples of suitable flameproofing agents are diphenyl cresyl phosphate, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl-)ethylene diphosphate, dimethyl methanephosphonate,- diethyldiethanolaminomethylphosphonate and commercially available halogen-containing flameproofing polyols.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate and calcium sulfate, or expandable graphite, and cyanuric acid derivatives, eg. melamine, or mixtures of two or more flameproofing agents, eg. ammonium polyphosphates and melamine, and also, if desired, starch in order to flameproof the hard PU or PU-PIR foams prepared according to the invention. In general, it has proven expedient to use from 5 to 50 parts by weight, preferably from 5 to 25 parts by weight, of said flameproofing agents or mixtures per 100 parts by weight of components (a) to (c).

Further details on the other conventional auxiliaries and additives mentioned above can be obtained from the specialist literature, for example from the monograph by J. H. Saunders and K. C. Frisch, High Polymers, Volume XVI, Polyurethanes, Parts 1 and 2, Interscience Publishers, 1962 and 1964 respectively, or the Kunststoff-Handbuch, Polyurethane, Volume VII, Carl-Hanser-Verlag, Munich, Vienna, 1st and 2nd editions, 1966 and 1983.

To prepare the hard PU foams, the organic, modified or unmodified polyisocyanate (a), the high-molecular-weight compound having two or more reactive hydrogen atoms (b), the organic carboxylic acid (d) and, if desired, the chain extender and/or crosslinking agent (c) are reacted in such an amount that the isocyanate characteristic number, which describes the equivalence ratio between the NCO groups of the polyisocyanate (a) and the total number of reactive hydrogen atoms of components (b), (d) and, if used, (c) is in the range from 90 to 500, preferably from 100 to 400, in particular from 115 to 300. If the urethane-containing hard foams are modified by the formation of isocyanurate groups, for example in order to increase the flame resistance, an isocyanate characteristic number of up to 1500, preferably from 300 to 1200, in particular from 500 to 1000, is usually used.

The hard PU or PU-PIR foams can be prepared batchwise or continuously by the prepolymer process or preferably by the one-shot process using conventional mixers.

It has proven particularly advantageous to use the two-component process and to combine the starting components (b), (d), (e) and, if desired, (c) and (f) in component (A) and to use as component (B) the organic polyisocyanate, the modified polyisocyanate (a) or a mixture of said polyisocyanates.

The starting components are mixed at from 15° to 90° C., preferably from 20° to 65° C., in particular from 20° to 35° C. and introduced into an open mold with or without temperature control, in which the reaction mixture is allowed to expand essentially under atmospheric pressure in order to avoid a compacted peripheral zone. To form composite elements, the rear of an outer layer is expediently coated, for example by pouring or spraying, with the foamable reaction mixture, which is then allowed to expand and cure to form a hard PU or PU-PIR foam.

The hard PU or PU-PIR foams prepared by the process according to the invention advantageously have densities of from 15 to 100 g/l and preferably from 28 to 60 g/l.

The hard PU or PU-PIR foams are preferably used as the heat-insulating intermediate layer in composite elements and for foam-filling cavities in refrigeration equipment casings, in particular for refrigerators and chest freezers, and as the outer jacket of hot-water storage tanks. The products are furthermore suitable for insulating warmed materials, as engine covers and as pipe shells.

In the examples, parts are by weight.

EXAMPLE 1

Component A: Mixture comprising

| 43.5 parts | of a glycerol-initiated polyoxypropylene-polyol having a mean molecular weight of 400 (= polyol A), |
| 43.5 parts | of a glycerol/sucrose/water-initiated polyoxypropylenepolyol having a mean molecular weight of 600 (= polyol B), |
| 1.0 part | of a silicone-based surfactant (Tegostab ® |

| | |
|---|---|
| 6.0 parts | B 8409 from Goldschmidt AG, Essen), of acetic acid and |
| 6.0 parts | of a 50% strength by weight solution of (trimethyl-2-hydroxypropyl) ammonium formate in dipropyl glycol. |

Component B:

Mixture containing 4,4'-, 2,4'- and 2,2'-diphenylmethane diisocyanates and polyphenylpolymethylene polyisocyanates (=crude MDI).

49 g of component A and
51 g of component B
were mixed vigorously, corresponding to an NCO index of 100, at 23° C. using a high-speed stirrer (1500 rpm), and the reaction mixture was transferred into a plastic beaker with a capacity of 1.1 l, where it was allowed to expand.

The following properties were determined on the hard foam prepared in this way: the initiation time, the setting time, the drying time, the rise time and the core density in accordance with DIN 53 420.

COMPARATIVE EXAMPLE I

The procedure was similar to that of Example 1, but component A comprised:

| | |
|---|---|
| 44.0 parts of polyol A, | |
| 44.0 parts of polyol B, | |
| 1.0 part of Tegostab ® B 8409, | |
| 6.0 parts of acetic acid and | |
| 5.0 parts of bis(dimethylaminoethyl) ether. | |

Component B: as in Example 1.

49.6 parts of component A were mixed with 50.4 parts of component B in the manner indicated in Example 1 and allowed to expand.

The following were determined as in Example 1 on the hard foams prepared in this way: the initiation time, the setting time, the drying time and the core density in accordance with DIN 53 420.

The results obtained are given in Table I.

TABLE I

| | Example 1 | Comparative Example I |
|---|---|---|
| Initiation time [s] | 12 | 17 |
| Setting time [s] | 68 | 66 |
| Drying time [s] | 86 | 85 |
| Rise time [s] | 115 | — |
| Core density [g/dm³] | 43.5 | 118 |

Virtually identical reaction times were determined in the preparation of the hard PU foams as in Example 1 and Comparative Example I. As a consequence of the use of the catalyst suitable according to the invention, the hard PU foam from Example 1 had a significantly lower density.

EXAMPLE 2

Component A: mixture comprising

| | |
|---|---|
| 44.2 parts | of polyol A, |
| 44.2 parts | of polyol B, |
| 1.0 part | of a silicone-based surfactant (Tegostab ® B 8409), |
| 7.4 parts | of propionic acid and |
| 3.2 parts | of a solution of potassium acetate in ethylene glycol. |

Component B: crude MDI.

45 g of component A and
55 g of component B
were mixed vigorously, corresponding to an NCO index of 115, at 23° C. by means of a high-speed stirrer (1500 rpm) and the reaction mixture was transferred into a plastic beaker having a capacity of 1.1 l, where it was allowed to expand.

COMPARATIVE EXAMPLE II

The procedure was similar to that of Example 2, but component A comprised:

| | |
|---|---|
| 43.7 parts | of polyol A, |
| 43.7 parts | of polyol B, |
| 1.0 part | of a silicone-based surfactant (Tegostab ® B 8409), |
| 7.4 parts | of propionic acid and |
| 4.2 parts | of triethylenediamine (DABCO ® 33 LV from AIR PRODUCTS) |

46 parts of component A and 53 parts of component B were reacted in a similar manner to that of Example 2.

The reaction parameters measured during the preparation of the hard PU foam and the core density in accordance with DIN 53 420 of the foams obtained are given in Table II.

TABLE II

| | Example 2 | Comparative Example II |
|---|---|---|
| Initiation time [s] | 21 | 18 |
| Setting time [s] | 69 | 70 |
| Drying time [s] | 85 | 90 |
| Core density [g/l] | 63 | 80 |

EXAMPLE 3

Component A: mixture comprising

| | |
|---|---|
| 32.0 parts | of polyol A, |
| 32.0 parts | of polyol B, |
| 0.7 part | of a silicone-based surfactant (Tegostab ® B 8409), |
| 30.0 parts | of ricinoleic acid and |
| 5.3 parts | of a 75% strength by weight solution of trimethyl-2-hydroxypropylammonium octanoate in dipropylene glycol. |

Component B: crude MDI 37 parts of component A and
63 parts of component B
were mixed vigorously, corresponding to an NCO index of 180, at 23° C., and the reaction mixture was allowed to expand in a plastic beaker.

COMPARATIVE EXAMPLE III

Component A: mixture comprising

| | |
|---|---|
| 32.3 parts | of polyol A, |
| 32.3 parts | of polyol B, |
| 0.7 part | of a silicone-based surfactant (Tegostab ® B 8409), |
| 30.2 parts | of ricinoleic acid and |
| 4.5 parts | of N,N,N',N'-tetramethyl-1,6-hexane- | diamine.

Component B: crude MDI.
38 parts of component A and
62 parts of component B
were mixed vigorously, corresponding to an NCO index of 180, at 23° C., and the reaction mixture was allowed to expand in a plastic beaker.

The reaction parameters measured during the preparation of the hard PU foam and the core density in accordance with DIN 53 420 of the foams obtained are given in Table III.

TABLE III

|  | Example 3 | Comparative Example III |
|---|---|---|
| Initiation time [s] | 22 | 15 |
| Setting time [s] | 70 | 67 |
| Drying time [s] | 100 | 95 |
| Core density [g/l] | 52 | 89 |

EXAMPLE 4

Component A: mixture comprising

| 33.7 parts | of polyol A, |
|---|---|
| 33.7 parts | of polyol B, |
| 0.8 part | of a silicone-based surfactant (Tegostab ® B 8409), |
| 20.1 parts | of tris(2-chloroethyl) phosphate, |
| 6.0 parts | of acetic acid and |
| 5.7 parts | of a 50% strength by weight solution of (trimethyl-2-hydroxypropyl) ammonium formate in dipropylene glycol. |

Component B: crude MDI.
44 parts of component A and
56 parts of component B
were mixed vigorously, corresponding to an NCO index of 150, at 23° C., and the reaction mixture was allowed to expand in a plastic beaker.

COMPARATIVE EXAMPLE IV

Component A: mixture comprising

| 34.1 parts | of polyol A, |
|---|---|
| 34.1 parts | of polyol B, |
| 0.8 part | of a silicone-based surfactant (Tegostab ® B 8409), |
| 20.0 parts | of tris(2-chloroethyl) phosphate, |
| 6.0 parts | of acetic acid and |
| 5.0 parts | of bis(dimethylaminoethyl) ether. |

Component B: crude MDI
46 parts of component A and
54 parts of component B
were mixed vigorously, corresponding to an NCO index of 150, and the reaction mixture was allowed to expand in a plastic beaker.

The reaction parameters measured during the preparation of the hard PU foam and the core density in accordance with DIN 53 420 of the foams obtained are given in Table IV.

TABLE IV

|  | Example 4 | Comparative Example IV |
|---|---|---|
| Initiation time [s] | 8 | 12 |
| Setting time [s] | 70 | 70 |
| Drying time [s] | 85 | 90 |
| Core density [g/l] | 41 | 127 |

EXAMPLE 5

Component A: mixture comprising

| 28.2 parts | of polyol A, |
|---|---|
| 28.2 parts | of polyol B, |
| 0.6 part | of a silicone-based surfactant (Tegostab ® B 8409), |
| 10.0 parts | of the flameproofing agent PHT-4-diol from Great Lakes, |
| 30.0 parts | of ricinoleic acid and |
| 3.0 parts | of a solution of potassium acetate in ethylene glycol. |

Component B: crude MDI.
35 parts of component A and
65 parts of component B
were mixed vigorously, corresponding to an NCO index of 200, and the reaction mixture was allowed to expand in a plastic beaker.

COMPARATIVE EXAMPLE V

Component A: mixture comprising

| 27.5 parts | of polyol A, |
|---|---|
| 27.5 parts | of polyol B, |
| 0.6 part | of a silicone-based surfactant (Tegostab ® B 8409), |
| 10.1 parts | of the flameproofing agent PHT-4-diol from Great Lakes, |
| 30.0 parts | of ricinoleic acid and |
| 4.3 parts | of N,N,N',N'-tetramethyl-1,6-hexanediamine. |

Component B: crude MDI
37 g of component A and
63 g of component B
were mixed vigorously, corresponding to an NCO index of 200, at 23° C. and the reaction mixture was allowed to expand in a 1.1 l plastic beaker.

The reaction parameters measured during the preparation of the hard PU foam and the core density in accordance with DIN 53 420 of the foams obtained are given in Table V.

TABLE V

|  | Example 5 | Comparative Example V |
|---|---|---|
| Initiation time [s] | 20 | 12 |
| Setting time [s] | 70 | 70 |
| Drying time [s] | 110 | 100 |
| Core density [g/l] | 56 | 93 |

EXAMPLE 6

Component A: mixture comprising

| 30.0 parts | of polyol A, |
|---|---|
| 30.0 parts | of polyol B, |
| 0.7 part | of a silicone-based surfactant (Tegostab ® B 8409), |
| 30.1 parts | of diphenyl cresyl phosphate, |
| 6.0 parts | of acetic acid and |
| 3.2 parts | of tris(dimethylaminopropyl)-s-hexahydro- |

-continued

| triazine. |
|---|

Component B: crude MDI.
32 g of component A and
68 g of component B
were mixed vigorously, corresponding to an NCO index of 300, and the reaction mixture was transferred into a 1.1 l beaker, where it was allowed to expand.

COMPARATIVE EXAMPLE VI

Component A: mixture comprising

| 28.9 parts | of polyol A, |
|---|---|
| 28.9 parts | of polyol B, |
| 0.7 part | of a silicone-based surfactant (Tegostab ® B 8409), |
| 30.0 parts | of diphenyl cresyl phosphate, |
| 30.0 parts | of acetic acid and |
| 5.5 parts | of pentamethyldiethylenetriamine. |

Component B: crude MDI
32 parts of component A and
68 parts of component B
were mixed vigorously, corresponding to an NCO index of 300, and the reaction mixture was allowed to expand in an open beaker.

The reaction parameters measured during the preparation of the hard PU foam and the core density in accordance with DIN 53 420 of the foams obtained are given in Table VI.

TABLE VI

| | Example 6 | Comparative Example VI |
|---|---|---|
| Initiation time [s] | 15 | 10 |
| Setting time [s] | 70 | 70 |
| Drying time [s] | 85 | 90 |
| Core density [g/l] | 75 | 87 |

COMPARATIVE EXAMPLE VII

Component A: mixture comprising

| 39.8 parts | of polyol A, |
|---|---|
| 39.8 parts | of polyol B, |
| 0.9 part | of a silicone-based surfactant (Tegostab ® B 8409), |
| 18.0 parts | of trichlorofluoromethane and, |
| 1.5 parts | of a 75% strength solution of trimethyl-2-hydroxpropylammonium octanoate in diproylene glycol. |

Component B: crude MDI
49.5 parts of component A and
50.5 parts of component B
were mixed vigorously, corresponding to an NCO index of 130, and the reaction mixture was allowed to expand in an beaker.

COMPARATIVE EXAMPLE VIII

Component A: mixture comprising

| 39.2 parts | of polyol A, |
|---|---|
| 39.2 parts | of polyol B, |
| 0.9 part | of a silicone-based surfactant (Tegostab ® B 8409), |
| 18.0 parts | of trichlorofluoromethane and, |

-continued

| 2.7 parts | of dimethylcyclohexylamine. |
|---|---|

Component B: crude MDI
50.4 parts of component A and
49.6 parts of component B
were mixed vigorously, corresponding to an NCO index of 130, and the reaction mixture was transferred into a plastic beaker, where it was allowed to expand.

The reaction parameters measured during preparation of the hard PU foam by the method of Comparative Examples VII and VIII and the core density in accordance with DIN 53 420 of the foams prepared are given in Table VII.

TABLE VII

| | Comparative Example VII | Comparative Example VIII |
|---|---|---|
| Initiation time [s] | 28 | 17 |
| Setting time [s] | 65 | 68 |
| Drying time [s] | 70 | 90 |
| Core density [g/l] | 47 | 44 |

While the carboxylic acids which are suitable according to the invention and the catalysts which are suitable according to the invention are combined with one another in Examples 1 to 6, any polyurethane catalyst can be used in Comparative Examples I to VI.

Comparative Examples VII and VIII show that neither the use of the catalyst which is suitable according to the invention (Comparative Example VII) nor of a conventional polyurethane catalyst has any positive effect on the blowing reaction in the absence of carboxylic acid.

Instead, the catalysts according to the invention have the opposite effect in the absence of carboxylic acid, ie. hard PU foams having a higher core density are formed (Comparative Example VII).

We claim:

1. An open mold process for the preparation of a hard foam containing urethane groups or containing urethane and isocyanurate groups having densities from 15 kg/m³ to 100 kg/m³, by reacting
   a) an organic and/or modified organic polyisocyanate with
   b) at least one high-molecular-weight compound containing at least two reactive hydrogen atoms and, if desired,
   c) a low-molecular-weight chain extender and/or crosslinking agent, in the presence of
   d) a blowing agent,
   e) a catalyst, and, if desired,
   f) assistants and/or additives, wherein the blowing agent (d) used is at least one organic carboxylic acid in an amount of from 0.5 to 30 parts by weight, based on 100 parts by weight of the high-molecular-weight compound, and the catalyst (e) used is a polyisocyanurate catalyst in an amount of from 1 to 10 parts by weight based on 100 parts by weight of the high molecular weight compound.

2. A process as claimed in claim 1, wherein the organic carboxylic acid used is used in combination with water and/or a physical blowing agent.

3. A process as claimed in claim 1, wherein the blowing agent (d) used is an aliphatic monocarboxylic acid having a molecular weight of from 60 to 300.

4. A process as claimed in claim 1, wherein the blowing agent (d) used is acetic acid.

5. A process as claimed in claim 1, wherein the polyisocyanurate catalyst used is an alkali metal salt or ammonium salt of an organic carboxylic acid or tris(-dialkylaminoalkyl)-s-hexahydrotriazines.

6. A process as claimed in claim 1, wherein the polyisocyanurate catalyst is selected from the group comprising (trimethyl-2-hydroxypropyl)ammonium octanoate, (trimethyl-2-hydroxypropyl)ammonium formate, potassium acetate, potassium formate and tris(-dimethylaminopropyl)-s-hexahydrotriazine.

7. A process as claimed in claim 1, wherein the isocyanate characteristic number is in the range from 90 to 500.

8. A process as claimed in claim 1, wherein the blowing agent (d) used is at least one aliphatic monocarboxylic acid selected from the group comprising acetic acid, propionic acid and 2-ethylhexanoic acid, and the catalyst (e) used is at least one polyisocyanurate catalyst selected from the group comprising (trimethyl-2-hydroxypropyl)ammonium octanoate, (trimethyl-2-hydroxypropyl)ammonium formate, potassium acetate, potassium formate and tris(dialkylaminoalkyl)-s-hexahydrotriazine.

* * * * *